United States Patent [19]

Coni et al.

[11] Patent Number: 5,801,682
[45] Date of Patent: Sep. 1, 1998

[54] TACTILE DESIGNATION DEVICE WITH HIGH-RESOLUTION TRANSPARENT CAPACITIVE SURFACE

[75] Inventors: Philippe Coni, St Jean D'Illac; Pierre Fagard, Elancourt, both of France

[73] Assignee: Sextant Avionique, Velizy Villacoublay, France

[21] Appl. No.: 616,251

[22] Filed: Mar. 15, 1996

[30] Foreign Application Priority Data

Mar. 24, 1995 [FR] France ................. 95 03501

[51] Int. Cl.$^6$ ............... G09G 3/02; G08C 21/00
[52] U.S. Cl. .............. 345/174; 345/173; 178/18; 178/20
[58] Field of Search .............. 178/18, 19, 20; 345/173, 174

[56] References Cited

U.S. PATENT DOCUMENTS

| | | | |
|---|---|---|---|
| 5,113,041 | 5/1992 | Blonder et al. | 178/19 |
| 5,231,381 | 7/1993 | Duwaer | 178/19 |
| 5,374,787 | 12/1994 | Miller et al. | 178/18 |
| 5,376,948 | 12/1994 | Roberts | 345/173 |
| 5,488,204 | 1/1996 | Mead et al. | 178/18 |

*Primary Examiner*—Steven J. Saras
*Assistant Examiner*—Vijay Shankar
*Attorney, Agent, or Firm*—Oblon, Spivak, McClelland, Maier & Neustadt, P.C.

[57] ABSTRACT

A tactile designation device comprises a continuous transparent capacitive surface supported at its corners by flexible strips to which there are attached strain gauges, a HF supply source, a series capacitor, a multiplexer, a detection circuit and a computer. The corners of the capacitive surface are connected alternately to the HF voltage, and the voltages measured are compared with a table of values to determine the touch point.

16 Claims, 3 Drawing Sheets

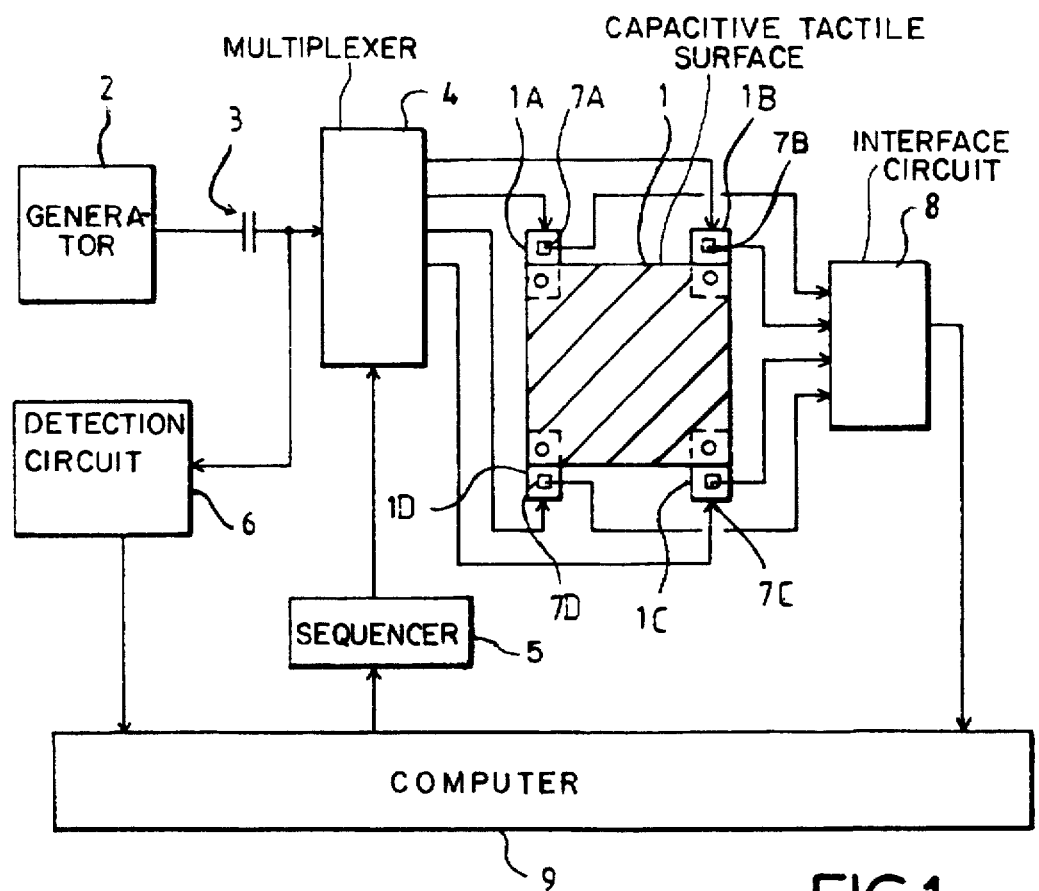
FIG.1
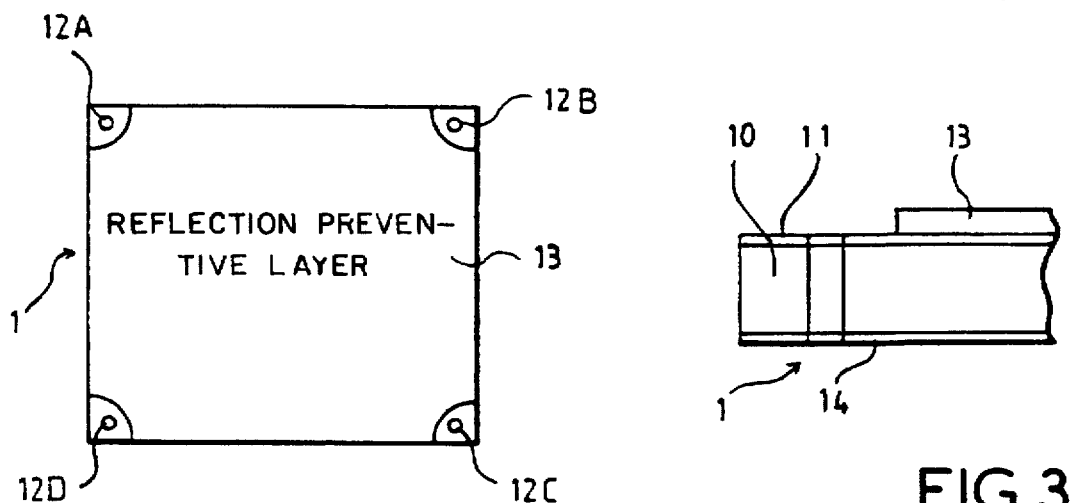
FIG.2
FIG.3
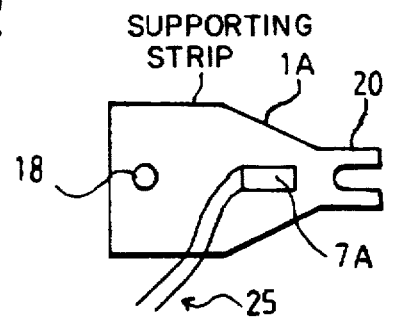
FIG.4

|  | 1A | 1B | 1C | 1D |
|---|---|---|---|---|
| t1 | e | ∿ | m | ∿ |
| t2 | ∿ | e | ∿ | m |
| t3 | m | ∿ | e | ∿ |
| t4 | ∿ | m | ∿ | e |
FIG. 7
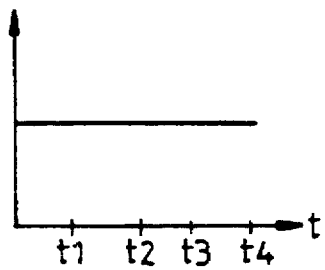
FIG. 8A
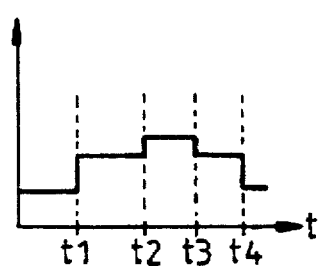
FIG. 8B
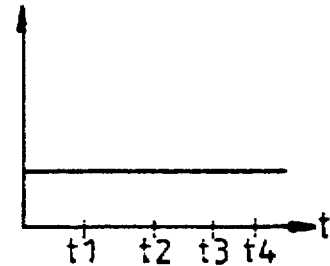
FIG. 8C
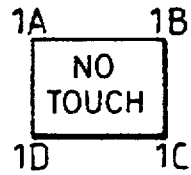
FIG. 8D
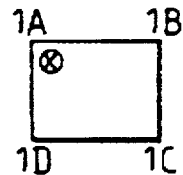
FIG. 8E
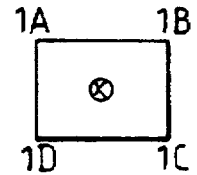
FIG. 8F

TACTILE DESIGNATION DEVICE WITH HIGH-RESOLUTION TRANSPARENT CAPACITIVE SURFACE

BACKGROUND OF THE DESCRIPTION

1. Field of the Invention

The present invention pertains to a tactile designation device with a high-resolution transparent capacitive surface.

Transparent touch-screen or tactile surfaces are used in the front of units for the display of images, possibly images of a wide variety, in order to give them a function of tactile designation. This function is thus obtained in a mechanically and electrically simple manner and at low cost without particularly attenuating the view of these images. In the case of application to small-sized display units (with a surface area of less than 100×100 mm), the constraints of space requirement and cost are decisive.

When these tactile surfaces are continuous, namely when they do not have designation areas physically represented by a matrix network of conductors but a continuous conductive surface associated with capacitive detection, their selective resolution may be very high.

2. Description of the Prior Art

Known transparent tactile surfaces generally have the following elements:

a glass plate partially covered with a very thin and transparent metal deposit, that are etched in the discrete capacitive mode and not etched when the mode is the continuous capacitive mode, a strain detector on which the glass plate lies, this detector being formed by sensors made with metal plates for which the deformation is measured by means of resistive strain gauges positioned at the four corners of the glass plate, a connection circuit to supply the detection zones of the plate, a circuit for the connection of the strain detectors, a mechanical supporting device holding all the elements in position and enabling the performance of the mechanical adjustments that may be necessary, an electronic circuit for the supply of power and for the processing of the signals coming from the detection zones, and an electronic circuit for the processing of the signals from the strain sensors.

Known tactile surfaces with the above-mentioned elements have many drawbacks. First of all, discrete keys are etched on the glass plate. Each key has its own conductive supply track and it can be seen that it is very difficult to make an efficient reflection-preventive coating on the plate because it is necessary to have very low key connection resistance values in order to obtain high sensitivity. This requires a great thickness of the metal layer. Furthermore, this embodiment requires a large number of connections (one per key) and, hence, a correspondingly large number of electronic circuits connected to these keys. This approach is technically feasible because it provides high sensitivity (the user can wear gloves) but is costly because of the method of making the etched glass plate and because of the large number of connections required.

Other problems are due to the mechanical assembly of the glass plate. Since this plate can be mounted so as to be floating on its strain sensors, difficulties are encountered in its mechanical guidance, in the making of a set of connections capable of following the movement of the plate and in the need to make a device for the height-wise adjustment of each strain sensor so as to enable compensation for the positioning tolerance values.

Finally, because the glass plate is fitted with a flexible connection circuit (between the keys and the electronic circuits that have to be connected to them), the operations for positioning and dismantling this plate are difficult to perform.

The British patent application No. 2,205,164 describes a tactile or touch-screen designation device with a square transparent capacitive surface comprising a first group of electrodes formed at its four corners and a second group of electrodes formed in the middle of its sides. The defining of a touch point of this surface consists in simultaneously supplying all the electrodes of one group and measuring the different currents flowing through the electrodes and then simultaneously supplying all the electrodes of the other group by performing similar measurements in order to increase the precision of determination. Furthermore, this document specifies that it is necessary for the capacitive surface to have uniform resistivity. This implies a relatively thick metallized layer, hence lower optical qualities. The very principle of measurement requires a touch surface that is almost a pinpoint surface so as not to excessively disturb the regularity of the electrical field on the transparent surface. Furthermore, the measurement circuit connected to this capacitive surface requires "drivers" or interface circuits with matched impedances and the measurement may be disturbed by a drift in the characteristics of the components of this circuit. Achieving compensation for this drift is difficult and complicated.

SUMMARY OF THE INVENTION

An object of the present invention is a tactile designation device with a high resolution transparent tactile surface whose precision depends as little as possible on the way in which the touch (whether it is with a tip, flat finger or gloved finger, etc.) is made and does not depend on the drift in the characteristics of the components and on the homogeneity of the capacitive surface, requires few connections, costs little, has a mechanical attachment that is simple to make and position, while having high sensitivity.

The tactile designation device according to the invention has a substantially rectangular glass plate with a continuous transparent metal deposit, the plate being supported at its corners by flexible strips to which strain gauges are fixed. Tag stripes are capable of setting up the electrical connection between the metal deposit of the glass plate and the electronic circuits that follow it wherein the link comprises a series capacitor, and the electronic circuits comprises high frequency supply circuits and a computer. The device comprises a detection circuit, a pole of which is alternately connected to each of the corners of the metal deposit, the opposite corner being connected to the other pole, namely the ground, of the detection circuit, the other two corners being unconnected.

BRIEF DESCRIPTION OF THE DRAWINGS

The invention will be understood more clearly from the following detailed description of an embodiment taken as a non-restrictive example and illustrated by the appended drawings, of which:

FIG. 1 is a block diagram of a tactile designation system comprising the device of the invention, FIGS. 2 to 5 are detailed views of embodiments of components of the device of the invention, FIG. 7 is a diagram showing an exemplary switching process of the linking circuits of FIG. 6, and FIG. 8 is a timing diagram of signals appearing in the circuit of FIG. 6.

DETAILED DESCRIPTION OF THE DRAWING

Figure 5:
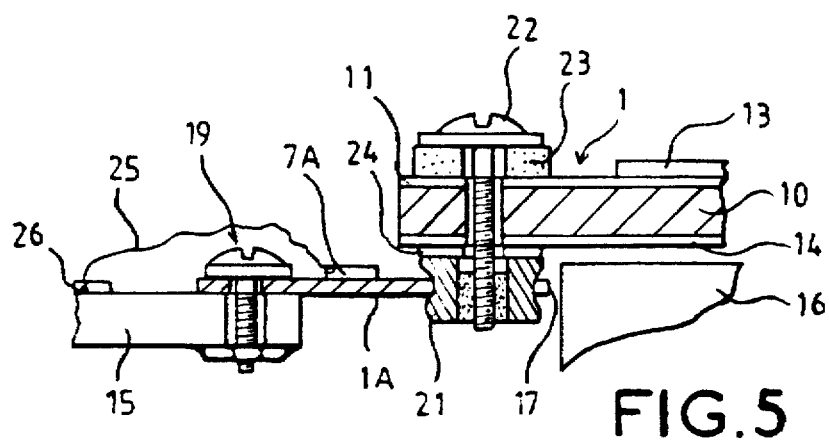

As can be seen in FIG. 1, the device of the invention has a capacitive tactile surface 1 supplied at high frequency by a generator 2 through an injection capacitor 3 and a multiplexer 4 that is controlled by a sequencer 5. The common point between the capacitor 3 and the multiplexer 4 is connected to a detection circuit 6 that carries out the impedance matching and an HF signal demodulation (modulated by the local variation of impedance of the surface 1 during the designation of a point by the user).

The capacitive surface 1 is advantageously made as described in the French patent 2,688,957 filed by the present Applicant, the main constituent elements of which are recalled here below with reference to FIGS. 2 to 5. The flexible fastening devices 1A to 1D of the surface 1 are each associated with a strain gauge, respectively 7A to 7D. The gauges 7A to 7D are connected to an interface circuit 8. The elements 5, 6 and 8 are connected to a computer 9.

The generator 2 has, for example, a frequency of about 2 MHz, but it may range from 500 kHz to 50 MHz approximately. The capacitor 3 has, for example, a value of 100 to 700 pF approximately. The impedance of the capacitive layer of the surface 1 is chosen so as to provide for efficient impedance matching with the circuit for the injection of the high frequency signal (namely the elements 2 to 4). Advantageously, the resistance of the capacitive layer of the plate 1, considered along any of its diagonals, ranges from 500 to 20,000 ohms. In any embodiment, it is sought to optimize the sensitivity of the tactile surface to obtain said impedance matching, as a function of the capacitance of the capacitor 3, the resistance of the capacitive layer of the plate 1 and the frequency. That is, it is sought to obtain the highest possible sensitivity of this plate, the sensitivity being defined here as the difference between the voltage detected at the terminals of the conductive layer (between two opposite corners) without tactile pressure on the surface and the voltage with tactile pressure on this surface.

The plate 1 has a glass substrate 10 (FIGS. 2 and 3) and, for example, a rectangular shape. Throughout its upper surface (the surface pointed towards the user), it has a coating 11 made of electrically conductive material, for example ITO (indium-tin-oxide) that is transparent in visible light. Holes 12A and 12D are drilled at the four corners of the glass substrate 10. The layer 11 is coated with a reflection-preventive layer 13 throughout its surface except at its four corners, around the holes 12A to 12D, in order to enable the electrical connection between the supporting strips 1A to 1D and the conductive layer 11. The lower surface of the substrate 10 is also covered with a reflection-preventive layer 14.

The supporting strips 1A to 1D are made of an electrically conductive flexible material. They provide for the attachment of the plate 1 to a support 15 to which a display device 16 is fixed, the plate 1 being fixed above this device 16, the images of which are seen through the plate 1. The support 15 is advantageously a printed circuit comprising the electronic circuits to which the conductive layer 11 is connected through the capacitor 3. In the present case, the support 15 comprises an aperture 17 through which there passes the upper part of the display device 16. It is clear that if the display device 16 is thin, it is not possible to make the aperture 17 and fix the display device 16 to the upper face of the support 15 and, therefore the fastening device of the plate 1 is then modified accordingly to raise it sufficiently above the display unit 16.

FIG. 4 shows an exemplary embodiment of a device for the flexible attachment of the plate 1 to the support 15. This device 1A takes the form, for example, of a flexible metal strip, one end of which has a hole 18 drilled through it enabling it to be fixed to the support 15 by means of a screw and nut assembly 19. The other end of the strip 1A has the shape of a U-like fork 20, this fork being engaged in the peripheral groove of an electrically conductive nut 21 in the shape of a cylinder that is narrowed towards the middle. This nut 21 is attached to a screw 22 going through the hole 12A. An electrically conductive flexible washer 23 is interposed between the head of the screw 22 and the conductive layer 11.

One or more metal washers 24 are interposed between the nut 21 and the layer 14 and are used for the height-wise adjustment of the plate 1 with respect to the support 15. The gauge 7A is attached, for example by bonding to one of the faces of the strip 1a, somewhere in the middle of the strips length. This gauge is connected by flexible conductive wires 25 to the associated processing and gauge supply circuit 26. This circuit is well known per se and shall not be described herein.

Figure 6:
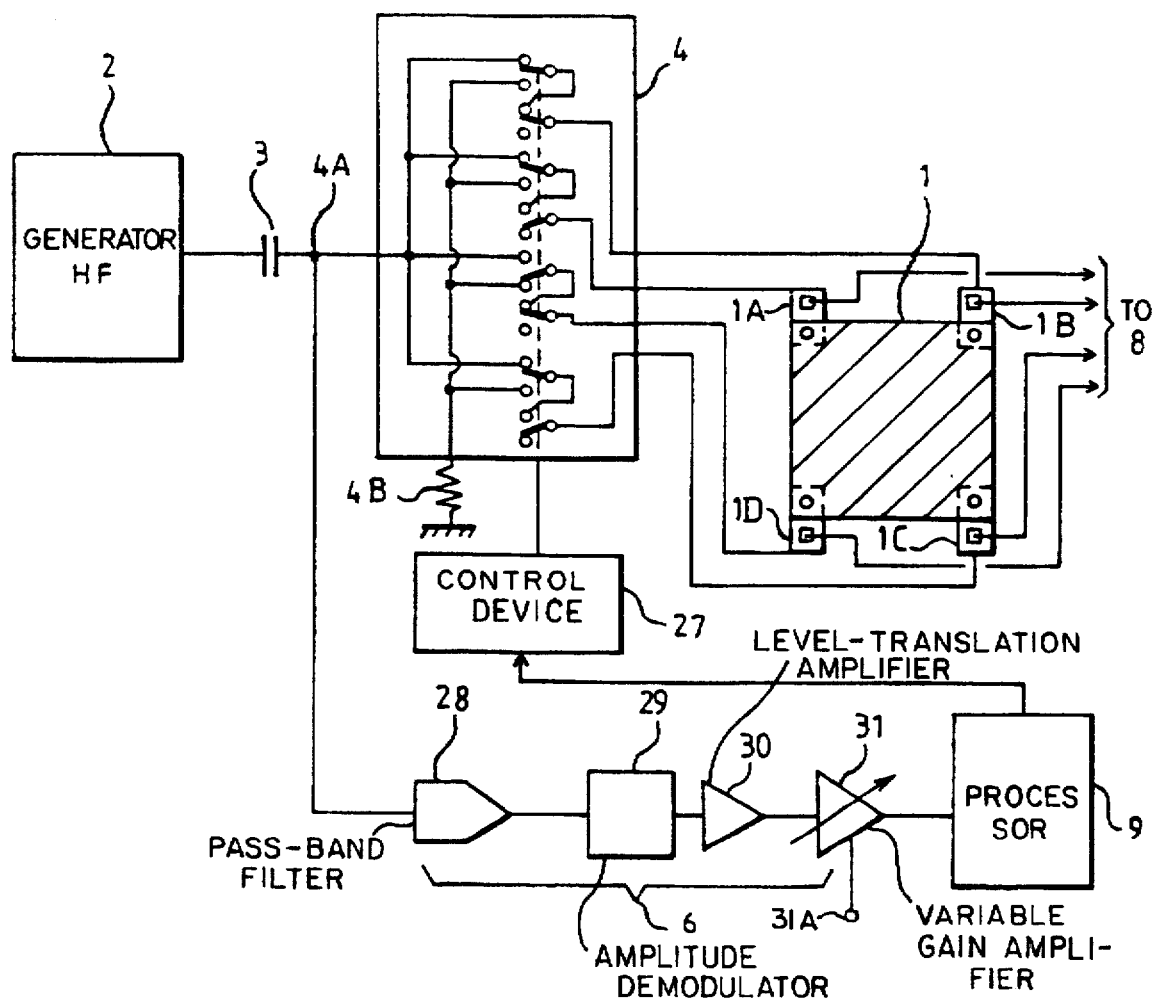
FIG. 6 is a block diagram of the linking circuits between the tactile surface and the detection circuits in the device according to the invention.

FIG. 6 shows a block diagram of the device for the processing of the signals arising out of the tactile surface 1. The sequencing or multiplexer circuit 4 is controlled by a control device 27 so as to connect the input terminal 4A of the multiplexer 4 successively to each of the support and electrical contact strips 1A to 1D, corresponding to the four corners of the surface 1, the other three corners being unconnected or connected to the ground, each time through a resistor 4B.

The terminal 4A is also connected to a processing system comprising a pass-band filter 28, an amplitude demodulator 29, a level-translation amplifier 30 (with restoration of the DC component) and a variable gain amplifier 31 (the gain control terminal 31A of which is connected to the processor 9). The output of the amplifier 31 is connected to the processor. The set of elements 28 to 31 forms the above-mentioned circuit 6.

The table of FIG. 7 shows an exemplary control cycle of the multiplexer 4. This cycle has four phases referenced t1 to t4. The different commands are referenced by the references of the strips (1A to 1D) corresponding to the four corners of the surface 1. The two possible actions are (1) referenced m (grounding of the corner considered) or e (application of a high-frequency voltage e to the corner considered), or (2) (corner not connected). As specified here above, at each of the phases t1 to t4, only one of the corners receives the voltage e, the opposite corner being grounded through the resistor 4B and the other two corners being unconnected, and during a complete cycle, the four corners receive the voltage e in turn.

The high-frequency voltage e collected at the point 4A depends on the corner of the surface 1 supplied and on the position of this surface on which the user applies pressure. The fact of successively supplying the four corners of the surface 1 makes it possible to remove the indeterminacy due to the symmetries of this surface (it being understood that it is homogeneous).

FIG. 8 shows three different cases for a square surface, in the following order: there is no touching of the surface, there is touching (with pressure on the surface) near the corner 1A on the diagonal A–C, and there is touching (again with pressure) close to its center. This touching introduces a capacitance between the touch point and the ground (through the user). With the resultant resistance between the point and the corner that is grounded, this capacitance forms a divider bridge with respect to the voltage at the terminal 4A. It is assumed that, during at least one full cycle of the multiplexer 4, the user's finger does not move, in other words the cycles of the multiplexer are very short as compared with the time during which the user applies pressure to the surface 1. In the former case, the four voltages collected are identical due to the geometrical, and hence electrical, symmetries of the surface. In the latter case, the touch capacitance due to the user introduces an impedance between the touch point and the ground. This impedance greatly diminishes the value of the voltage collected at the terminal 4A because the touch point is close to the corner 1A receiving the high frequency voltage and because, consequently, this capacitance is in parallel with the resultant resistance (representing the greater part of the resistance of the layer 11 measured between the corner 1A and the corner connected to the ground) between the touch point and the ground. For the supply of the opposite corner 1C, the position is reversed: the touch capacitance is in parallel with a resistor having a small part of the resistance of the layer 11 seen between the corner 1C and the ground. The voltage at the terminal 4A then diminishes very little. When the other two corners 1B and 1D are supplied, the resistance of the surface 11 seen from one of the corners is practically the same as that seen from the other corner, the touch point being on the diagonal A–C. Furthermore, since the touch point is close to the corner 1A, the capacitance provided by the user barely disturbs the impedance seen from the corners 1B and 1D.

The resistor 4B is used not only as a "guard resistor" (for the collection at 4A of a minimum measurable voltage when the touch point is very close to a corner and when this corner is supplied at high frequency), but also as a "linearization resistor" making it possible to obtain a sensitivity that has appropriate value and is roughly linear as a function of the resultant resistance at the touch point.

Thus, to enable the automatic definition of the location of the touch point in normal use, first a calibration step is performed by the measurement, for different touch points distributed throughout the useful part of the surface 1, of the voltages obtained at the four corners 1A to 1D and by the storage of the values of these voltages in a conversion table (included in the computer 9). Since the four corners are explored successively, there can be no ambiguity due to the symmetries: to each touch point of the surface 1, there corresponds one and only one set of four voltages corresponding to the four corners 1A to 1D. In normal use, it is enough to make a comparison, for a given touch point, of the four voltages measured and to compare them with each of the sets memorized to define the location of the touch point.

To simplify the comparison, it is advantageously possible to superimpose a virtual orthogonal matrix on the surface 1, dividing the surface 1 into small squares or rectangles forming a checkerboard pattern, each square or rectangle representing a "key". The voltages obtained at the four corners 1A to 1D are then read for a touch at the center of each of these keys. Depending on the voltages collected for the neighboring keys, a mean voltage is computed corresponding to the border between two neighboring keys along each of the axes of coordinates of the matrix. During the step of comparison in normal use, the mean voltages thus determined set the thresholds for which there is a passage from one key to another. The different voltages measured included between two successive thresholds in the two directions of the axes of the matrix are then compared to the voltage read for a touch at the center of the key, and all produce the same information element corresponding to this key.

The variable gain amplifier 31 enables the use of the device of the invention in a variety of conditions of use. For, in certain cases, the user may be required to wear gloves that he cannot remove to designate a zone of the surface 1, and, in other cases, the same surface may be made use of with the bare hands. Naturally, the capacitance provided by a user wearing gloves is far smaller than when he does not wear any gloves. Consequently the voltages collected in both cases are different, all the more so as the gloves may be thick. This difference may vary with the force of pressure on the surface 1. To overcome this drawback, the invention provides for the measurement of the voltages at the four corners 1A to 1D during at least one cycle without making any comparison with said conversion table. The computer 9 makes a computation, for example, of the mean value of the four voltages thus collected and, as a function of this mean value, controls the gain of the amplifier 31 so that, for a following measurement cycle, there is obtained a standardized mean value of these four voltages, this being a standardized value that can be obtained in any case of use envisaged.

According to one variant, instead of making the gain of the amplifier vary in wide proportions, this gain is made to vary in a limited range of values and provision is made for several conversion tables, only one of which is addressed as a function of the mean value of the voltages collected at the four corners of the surface 1.

According to another advantageous characteristic of the invention, in order to take account of the wearing out of the surface 1, a measurement is made, during the first use, of the voltages at 4A without pressure on the transparent surface for at least one cycle of measurement of the corners 1A to 1D and these voltages (which in principle should be all equal) are stored. The progress in time of the impedance of the capacitive surface can then be monitored by comparing the values thus with the current values, which will also be measured without pressure on the surface. These comparisons can be made automatically at the start of each period of use. The result of the comparison, in the case of a major difference, may be used to declare a malfunction and/or provide a warning of the need to carry out an operation for changing the surface. In the case of a small drift, the computer 9 may modify the gain of the amplifier 31 accordingly.

Owing to the fact that the four corners of the capacitive surface are supplied sequentially by a single switched measurement and current injection device, the device of the invention does not need any matched interfaces. It is not disturbed by drifts in the values of the parameters of components and may be used in a very wide variety of conditions: nonpinpoint touching with gloves or in a hostile environment (of vibrations, steam and mud, etc.). The quality of the conductive coating causes practically no deterioration in the defining precision and may therefore be very fine (with a thicknesses of some atomic layers) and may thus have high optical qualities (in terms of transparency, reflection-preventive treatment, etc.).

What is claimed is:

1. A tactile designation device with a transparent capacitive surface whose precision is independent of how contact is made with said surface and whose precision does not depend on a drift or on characteristics of components comprising;

a substantially rectangular glass plate having a continuous transparent metal deposit, said plate being supported at corners thereof by flexible strips configured to be fixed to strain gauges, said strips being configured to connect the metal deposit of the glass plate to an electronic circuit comprising high-frequency supply circuits and a computer, via a series capacitor: and a detection circuit having a pair of poles one of which is connected to a first corner of the metal deposit and the other pole being connected to an opposite corner of the detection circuit, and third and fourth corners being unconnected.

2. A device according to claim 1, wherein the high-frequency supply circuits have a frequency ranging between 500 kHz and 50 MHz approximately.

3. A device according to claim 1 or 2, wherein the series capacitor has a value ranging between 100 pF and 700 pF approximately.

4. A device according to claim 1, wherein said opposite corner is connected to the other pole of the circuit through a resistor.

5. A device according to claim 1, wherein the electronic circuits comprise a variable gain amplifier.

6. A device according to claim 1, wherein the computer has at least one conversion table in which there are memorized voltage values measured for different touch points of the capacitive surface.

7. A device according to claim 6, wherein the touch points correspond to the centers of keys of a Cartesian network of virtual keys of a capacitive surface.

8. A device according to claim 2, wherein said opposite corner is connected to the other pole of a circuit through a resistor.

9. A device according to claim 3, wherein said opposite corner is connected to the other pole of the circuit through a resistor.

10. A device according to claim 2, wherein the electronic circuits comprise a variable gain amplifier.

11. A device according to claim 3, wherein the electronic circuits comprise a variable gain amplifier.

12. A device according to claim 4, wherein the electronic circuits comprise a variable gain amplifier.

13. A device according to claim 8, wherein the electronic circuits comprise a variable gain amplifier.

14. A device according to claim 9, wherein the electronic circuits comprise a variable gain amplifier.

15. A device according to claim 2, wherein the computer has at least one conversion table in which there are memorized voltage values measured for different touch points of the capacitive surface.

16. A device according to claim 4, wherein the computer has at least one conversion table in which there are memorized voltage values measured for different touch points of the capacitive surface.

* * * * *